(12) United States Patent
Dinino Jones et al.

(10) Patent No.: US 12,428,847 B2
(45) Date of Patent: Sep. 30, 2025

(54) SYSTEMS AND METHODS FOR PROTECTIVE SHADING STRUCTURES

(71) Applicants: Emily Dinino Jones, Los Angeles, CA (US); John Carl, Hayward, CA (US); Daniel Coplon, Santa Monica, CA (US)

(72) Inventors: Emily Dinino Jones, Los Angeles, CA (US); John Carl, Hayward, CA (US); Daniel Coplon, Santa Monica, CA (US)

(73) Assignee: Thermoshade Solutions Inc., Los Angeles, CA (US)

( * ) Notice: Subject to any disclaimer, the term of this patent is extended or adjusted under 35 U.S.C. 154(b) by 0 days.

(21) Appl. No.: 18/821,986

(22) Filed: Aug. 30, 2024

(65) Prior Publication Data
US 2025/0075508 A1    Mar. 6, 2025

Related U.S. Application Data

(60) Provisional application No. 63/535,690, filed on Aug. 31, 2023.

(51) Int. Cl.
*E04F 10/08* (2006.01)
*F28D 15/02* (2006.01)
*H02S 20/25* (2014.01)

(52) U.S. Cl.
CPC .......... *E04F 10/08* (2013.01); *F28D 15/0275* (2013.01); *H02S 20/25* (2014.12)

(58) Field of Classification Search
CPC ...... E04F 10/08; H02S 20/25; F28D 15/0275; H10N 10/10; F24F 11/84
USPC ...................................................... 165/48.1
See application file for complete search history.

(56) References Cited

U.S. PATENT DOCUMENTS

| | | | |
|---|---|---|---|
| 4,290,416 A | 9/1981 | Maloney | |
| 4,498,459 A | 2/1985 | Korin et al. | |
| 4,625,710 A | 12/1986 | Harada et al. | |
| 5,770,295 A * | 6/1998 | Alderman | E04B 9/045 428/323 |
| 7,077,124 B2 * | 7/2006 | Szymocha | F24S 50/00 126/643 |
| 7,807,918 B2 | 10/2010 | Shingleton et al. | |
| 8,333,903 B2 | 12/2012 | Rolland et al. | |
| 8,825,500 B2 * | 9/2014 | DeBartolo, III | F24S 25/00 126/621 |
| 9,359,766 B2 * | 6/2016 | Shiao | E04D 5/10 |
| 9,709,349 B2 | 7/2017 | Raman et al. | |
| 9,957,719 B2 * | 5/2018 | Wiborg | E04F 10/08 |

(Continued)

FOREIGN PATENT DOCUMENTS

ES    2775015    7/2020

OTHER PUBLICATIONS

International Search Report and Written Opinion for International (PCT) Patent Application No. PCT/US2024/044879, dated Dec. 4, 2024, 14 pages.

*Primary Examiner* — Jon T. Schermerhorn, Jr.
(74) *Attorney, Agent, or Firm* — Sheridan Ross P.C.

(57) ABSTRACT

Thermal energy management and cooling systems are provided. In various embodiments, passive systems are provided that do not require a flow of liquid or the provision of electrical energy to deliver the cooling effect. Panels and shade structures are disclosed that comprise various features including, for example, phase change materials that are operable to cool an area or volume beneath or proximal to the panel.

20 Claims, 17 Drawing Sheets

(56) References Cited

U.S. PATENT DOCUMENTS

| | | | |
|---|---|---|---|
| 10,088,251 B2 | 10/2018 | Raman et al. | |
| 11,674,305 B1 * | 6/2023 | Neal | F28D 20/021 52/173.1 |
| 2010/0127000 A1 | 5/2010 | Horwath | |
| 2019/0296688 A1 | 9/2019 | Kresse et al. | |
| 2020/0208854 A1 | 7/2020 | Johnson et al. | |
| 2020/0232720 A1 | 7/2020 | Sawafta et al. | |
| 2022/0127843 A1 | 4/2022 | Krarti | |
| 2024/0266457 A1 | 8/2024 | Irshad et al. | |

\* cited by examiner

SYSTEMS AND METHODS FOR PROTECTIVE SHADING STRUCTURES

This U.S. Non-Provisional Patent Application claims the benefit of priority from U.S. Provisional Patent Application Ser. No. 63/535,690, filed Aug. 31, 2023, the entire disclosure of which is hereby incorporated by reference in its entirety.

FIELD

Embodiments of the present disclosure relate to methods and systems for structural elements useful for covering and shading various areas. Certain embodiments of the present disclosure contemplate the inclusion of one or more phase-change materials to provide enhanced cooling beneath or proximal to the structure. While various embodiments shown and described herein are well suited for providing shade and cooling, it will be recognized that embodiments of the present disclosure are not limited to providing shade. Systems of the present disclosure can provide various benefits including, for example, protection from various elements, ornamental and aesthetic benefits, and other features and benefits.

BACKGROUND

The benefits of protective, overhead coverings and shelters are well known. In 2024, however, the human race is presented with a warming planet that will require various adaptations in order for humans to continue to thrive. It is currently estimated that approximately 500,000 people die each year from heat-related causes. It is also known that various health conditions result from or are exacerbated by extreme heat even if such conditions are not fatal. The conditions that contribute to these issues are not expected to abate. For example, the city of Los Angeles, California is expected to experience three times as many extreme heat days by mid-century as compared with today.

Many urban environments lack shading structures, whether they be natural or man-made. Urban corridors devoid of shade and comprising vast areas of concrete and asphalt are known to suffer greater consequences in high heat conditions. Accordingly, there exists a long-felt and unmet need to provide cooling and thermoregulation solutions that are relatively quick and easy to install, require little or no electrical power or energy use, and which provide affordable shading and cooling to various environments.

SUMMARY

It is an object of the present disclosure to provide methods and systems for climate control, shading, covering, and/or protective structures that can be employed in various settings. Devices, systems and methods are contemplated for use in various settings and applications and no limitation with respect to the intended or final use of various embodiments of the present disclosure is provided herewith. For example, shading and cooling structures of the present disclosure are contemplated as being installed and used in public spaces, sidewalks, private outdoor spaces, parks, cafes, patios, outdoor parking facilities, multi-use paths, amusement parks, sports facilities, outdoor lines and queues, and various other applications. The foregoing are intended to serve as examples only and various other uses and applications are possible as will be recognized by one of ordinary skill in the art. Furthermore, systems and methods of the present disclosure are contemplated as being provided as permanent, semi-permanent, or temporary installations.

Certain embodiments of the present disclosure provide overhead or shade coverings that comprise one or more phase-change materials (hereafter "PCM"). As used herein, a PCM is a substance that either releases or absorbs energy at a phase transition to provide heating or cooling properties. No limitation with respect to a particular PCM or the states of matter provided with the PCM is provided. One example of a thermal management system and PCM contemplated for use with embodiments of the present disclosure is shown and described in U.S. Pat. No. 10,088,251 to Raman et al., which is hereby incorporated by reference in its entirety. A further example of known PCM materials is provided by U.S. Pat. No. 8,333,093 to Rolland et al. and 4,498,459 to Korin et al, which are hereby incorporated by reference in their entireties.

Embodiments of the present disclosure contemplate the provision of a multi-layered or composite structure. Structures and covers of the present disclosure contemplate a panel or surface that comprises a plurality of elements which may include, for example, a PCM, a reflective component, various structural components, ventilation, heat exchangers, airflow channels, a protective layer (e.g. a hail-protective layer), a water-proofing layer, photovoltaic components, and a transparent or translucent element.

Various embodiments of the present disclosure contemplate device mobility regardless of the particular make-up of the covering. For example, various embodiments of the present disclosure contemplate that a panel or covering is moveable (e.g. tiltable, rotatable, etc.) in order to maximize shade and/or photovoltaic efficiency (in embodiments that comprise photovoltaic features) as the sun moves throughout the day or based on user preference.

In one embodiment, a thermal management structure is provided that comprises at least one of a frame and a support member. A panel member is provided that comprises a plurality of components and wherein at least one of the plurality of components comprises a phase change material. The panel member extends over at least a portion of an area to be thermally managed and wherein the panel is operable to reflect energy before it reaches the area and cool the area by the absorption of heat energy in the phase change material. The thermal management structure may further comprise at least one rotatable element to increase efficiency based on a relative position of the sun. Thermal management structures of various embodiments contemplate that the phase change material is operable to provide cooling benefits by absorbing heat during a phase change during hot, daylight hours and recharge during nighttime hours by releasing latent heat.

It is a further object of the present disclosure to provide systems that are relatively inexpensive and simple to install and to scale. Accordingly, certain embodiments of the present disclosure comprise structures and systems for interconnecting a plurality of panels or coverings as shown and described herein and such that systems can be expanded or scaled.

It is contemplated that structures and panels of the present disclosure comprise various sizes, shapes and arrangements. No limitation is provided with respect to environments and/or applications that the embodiments of the present disclosure are applied to. For example, building envelopes, bus roof shelters, shipping containers, bench coverings, vehicle cockpits, electric vehicle charging stations, cabanas, ceiling structures (e.g. panels) and similar features may be provided with features and environments of the present disclosure. In various embodiments and as shown and described herein, features of the present disclosure are contemplated as being provided with interior or enclosed spaces and the disclosure is not limited to outdoor structures. For example, ceiling structures are contemplated as being provided with various features (PCM features and others) to cool an interior or enclosed space that is equipped with a heating, ventilation or air conditioning system. Such systems offer enhanced cooling, thermal management, and energy efficiencies at least as compared with conventional systems alone.

While various embodiments of the present disclosure rely at least partially on PCM features for enhanced cooling, additional cooling systems are contemplated as being provided. For example, powered fans, motors, pumps and similar features are contemplated as being provided.

In various embodiments, systems and coverings of the present disclosure also comprise additional energy capture features such as photovoltaics. The systems may also comprise integrated lighting systems, charging stations, etc. It is also contemplated that panels and structures of the present disclosure may comprise various connectivity or IoT features. For example, panels may be in communication with a system or network to track conditions of the system (e.g. daylight hours experienced, photovoltaic watts produced, etc.).

Panels of the present disclosure are contemplated as comprising various textures and colors to increase or decrease reflectivity, alter the ability to clean a panel, increase UV protectiveness, etc. Additionally, various embodiments of the present disclosure contemplate the incorporation of advertising, soundproofing materials, sound systems, etc.

While various embodiments of the present disclosure contemplate permanent or semi-permanent structures, it is further contemplated that systems of the present disclosure comprise smaller, lightweight versions that are portable or easily movable.

Various concepts disclosed herein may be provided in combination with one another even if such combination is not specifically depicted or described.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In addition, the materials, methods, and examples are illustrative only and are not intended to be necessarily limiting.

DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosure.

The drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

Reference to an element by the indefinite article "a" or "an" does not exclude the possibility that more than one element is present, unless the context clearly requires that there be one and only one element. The indefinite article "a" or "an" thus usually means "at least one."

As used herein, "about" means within a statistically meaningful range of a value or values such as a stated concentration, length, molecular weight, pH, sequence identity, time frame, temperature or volume. Such a value or range can be within an order of magnitude, typically within 20%, more typically within 10%, and even more typically within 5% of a given value or range. The allowable variation encompassed by "about" will depend upon the particular system under study, and can be readily appreciated by one of skill in the art.

Figure 1:
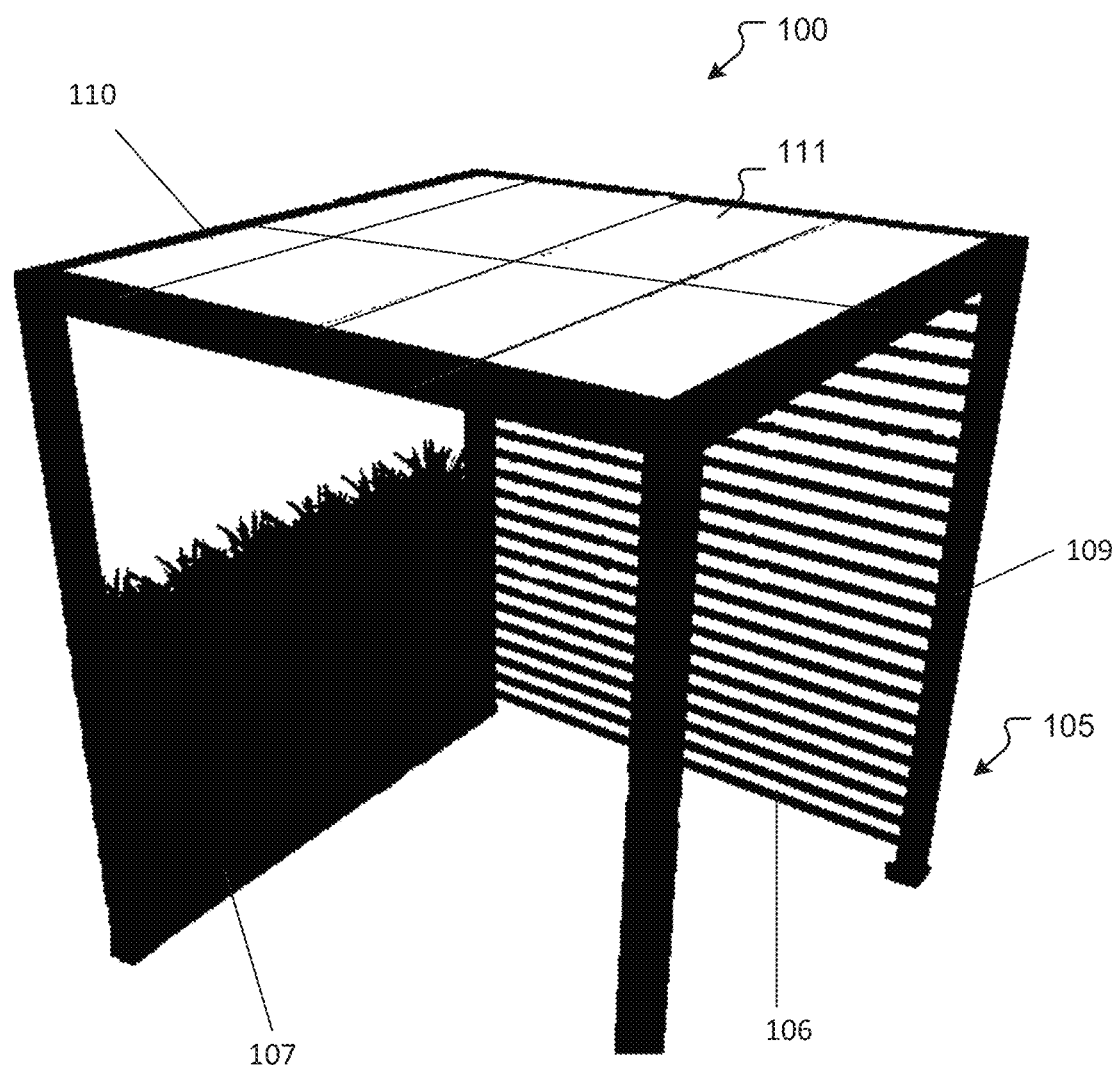
FIG. 1 is a perspective view of a protective shading structure according to one embodiment of the present disclosure.

FIG. 1 is a perspective view of a covering and cooling system 100 according to an embodiment of the present disclosure. As shown, the system 100 comprises a lower frame 105 with vertical support elements 109 and an upper frame 110 that is operable to support various shading and cooling features 111. The system 100 provides an at least partially sheltered outdoor space of a particular square footage that may vary. The system 100 is contemplated as comprising additional features including, for example a trellis wall 106 and one or more planters or integrated horticultural elements 107.

The shading and cooling features 111 of the system of FIG. 1 are contemplated as comprising various elements including but not limited to a PCM. A combination of shade, solar reflectivity, and a PCM provides for a space beneath and proximal to the system 100 with significant cooling properties and benefits without the use of electrical power or water. Additionally, the system provides a low-maintenance, flexible, modular design that can be adapted to various spaces. The cooling features 111 are contemplated as comprising an ultra-reflective coating that is operable to reflect about 85% or more of the sun's solar energy and a PCM that stores and releases cool thermal energy during the hottest part of the day and is operable to "recharge" at night. The system is contemplated as comprising various features including, for example, a trellis wall 109 and/or a planter feature 107.

Figure 2A:
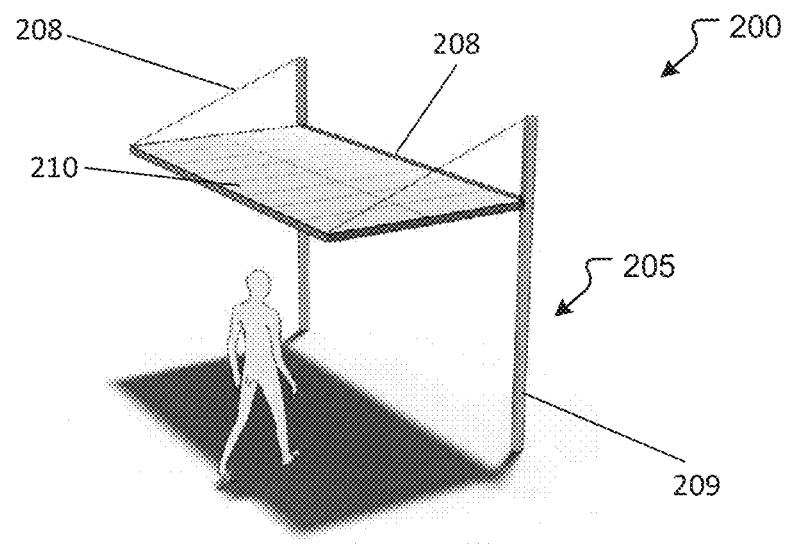
FIG. 2A is a perspective view of a protective shading structure according to one embodiment of the present disclosure.
Figure 2B:
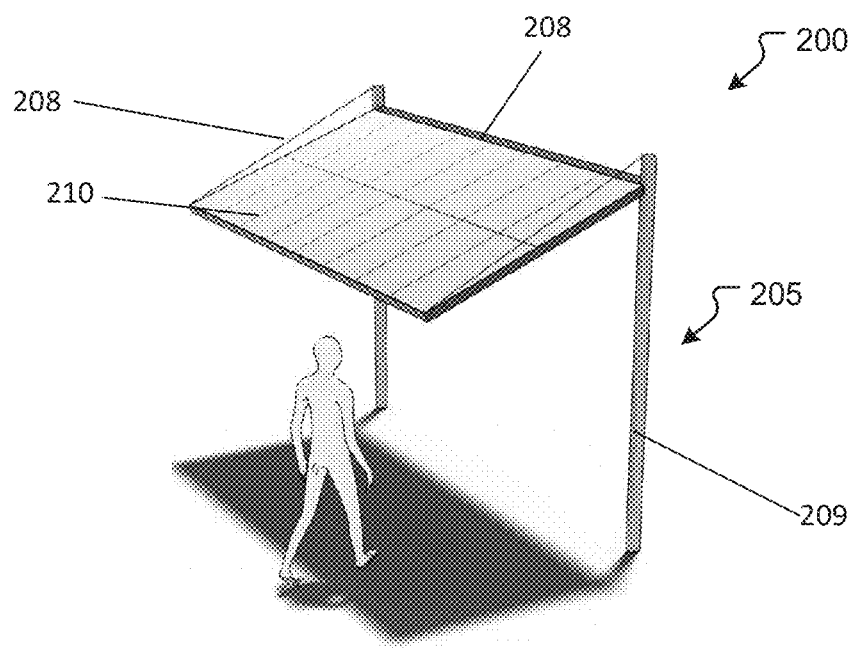
FIG. 2B is a perspective view of the structure of the embodiment of FIG. 2A.

FIGS. 2A-2B are perspective views of a structure 200 according to an embodiment of the present disclosure. As shown, the system 200 comprises an adjustable shading and cooling panel 210 supported by vertical supports 209 and wherein the cooling panel 210 is provided within a frame 208 and the cooling panel 210 is rotatable or tiltable to accommodate, for example, angle of the sun relative to normal throughout the day. The cooling panel is contemplated as being supported by one or more wires or other support members and wherein at least a portion of the frame 208 is translatable relative to the vertical supports 209. In various embodiments, shading and cooling structures as shown and described herein are contemplated as comprising a controller and wherein the system is automatically adjustable based on an angle of the sun. The panel may be adjustable based on a time of day and/or detected angle of incidence of the sun's rays, for example. The cooling panel 210 of FIGS. 2A-2B are contemplated as comprising various cooling features, including but not limited to PCMs and related features.

Figure 3:
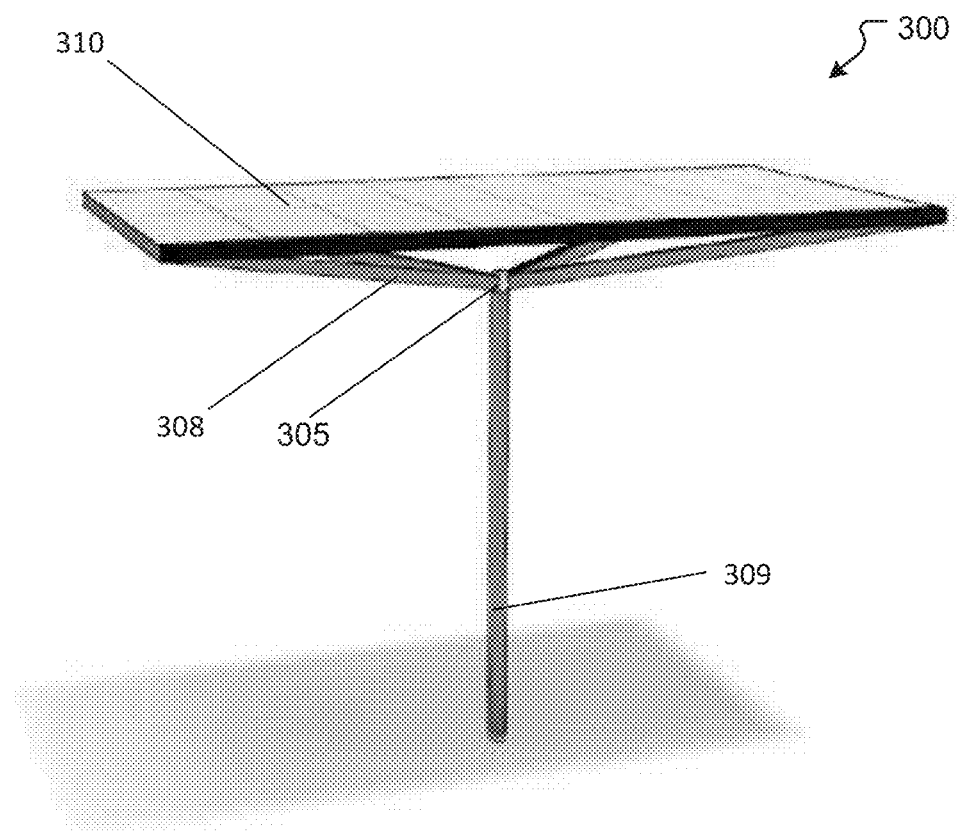
FIG. 3 is a perspective view of a protective shading structure according to one embodiment of the present disclosure.

FIG. 3 is a perspective view of a structural element 300 according to an embodiment of the present disclosure comprising a vertical support member 309 and a plurality of struts 308 supporting a shading panel 310 of the present disclosure. The panel is contemplated as comprising one or more PCMs, a reflective member, layer or coating, and related elements as shown and described herein. The panel 310 is contemplated as being rotatable about a vertical and/or horizontal axis by the provision of a ball joint 305.

Figure 4:
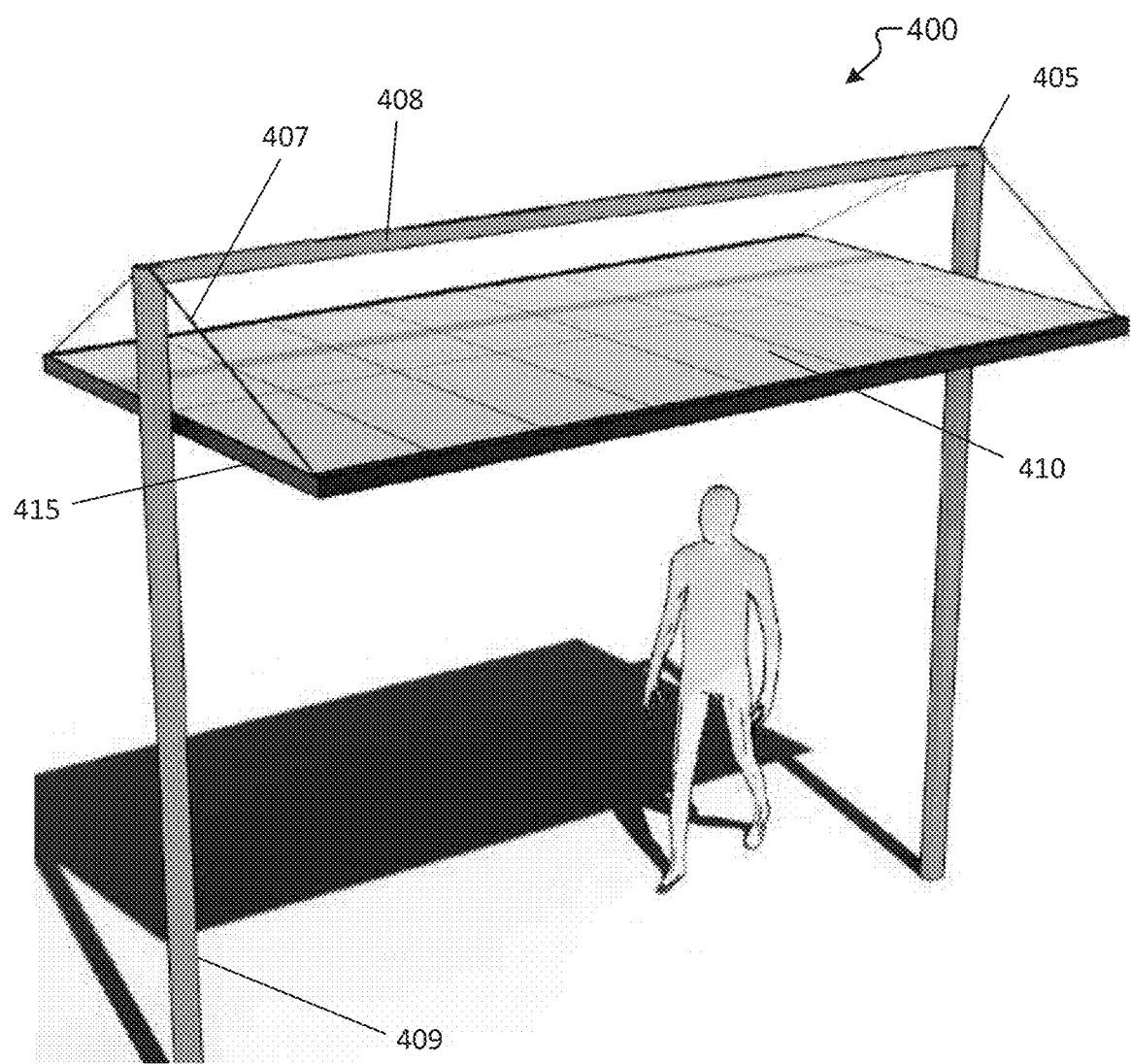
FIG. 4 is a perspective view of a protective shading structure according to one embodiment of the present disclosure.

FIG. 4 is a perspective view of a shading and cooling structure 400 according to another embodiment of the present disclosure. As shown, the structure 400 comprises a cooling panel 410 supported by wires 407 extending from a frame 408 comprising vertical supports 409. The panel 410 is contemplated as being hung or suspended from the frame 408. In some embodiments, the panel 410 is simply suspended and allowed to sway when impacted by wind loads (for example). In the embodiment of FIG. 4, one or more actuators 405 are provided to translate a wire or cable 408 and alter the position at which the panel 410 is disposed.

Figure 5A:
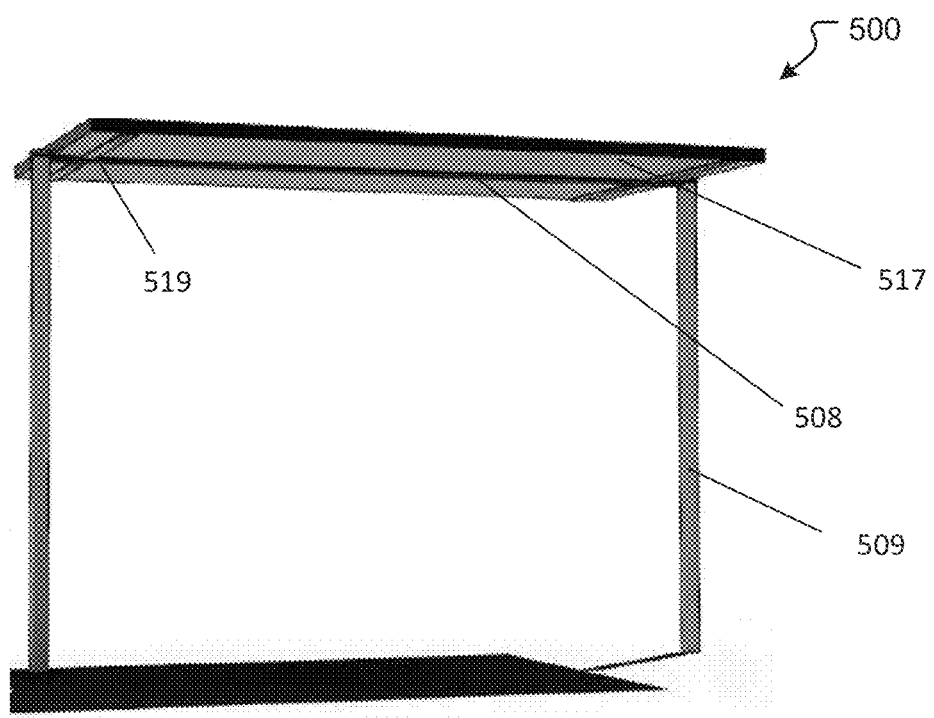
FIG. 5A is a perspective view of a protective shading structure according to one embodiment of the present disclosure.
Figure 5B:
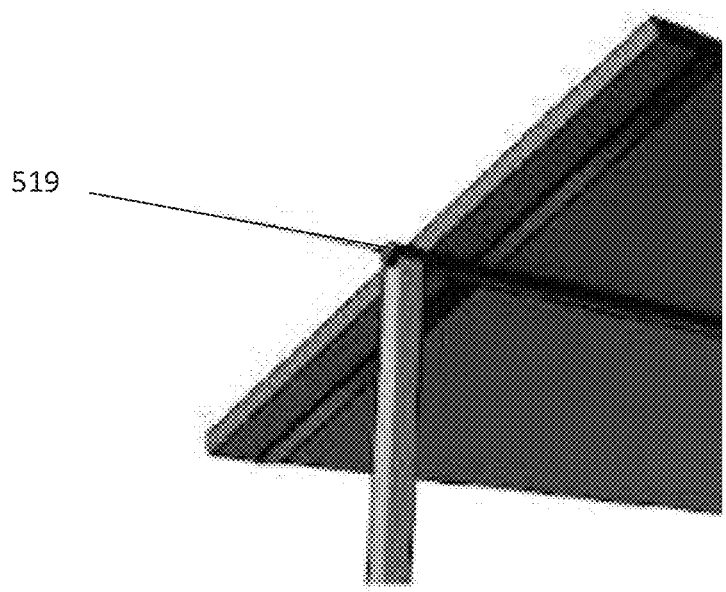
FIG. 5B is a perspective view of the structure of the embodiment of FIG. 5A.

FIGS. 5A-5B are perspective views of a structure 500 according to an embodiment of the present disclosure. As shown, the structure 500 comprises a frame 509 having vertical supports and a rotatable axle 508 which supports a panel 517. The axle 508 and panel 517 are rotatable about a horizontal axis to adjust the angle of the panel relative to a ground surface, for example. The panel 517 is contemplated as being adjustable so as to increase and angle of incidence with the sun and/or cast a larger or more desirable shadow beneath the structure 500. An actuator 519 is contemplated as being provided to adjust the panel angle.

Figure 6A:
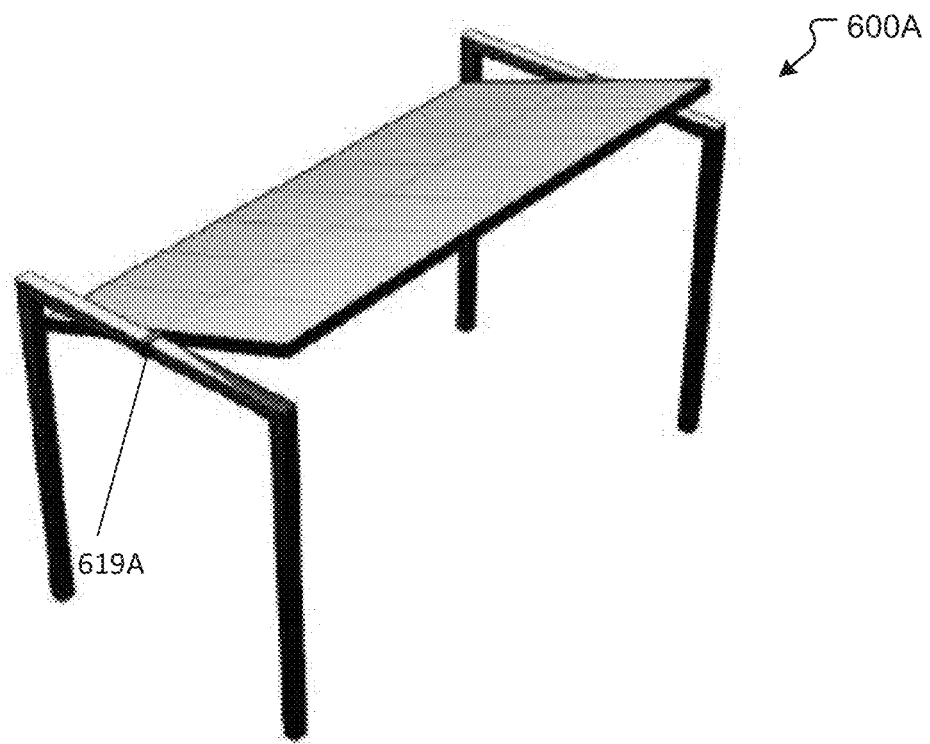
FIG. 6A is a perspective view of a protective shading structure according to one embodiment of the present disclosure.
Figure 6B:
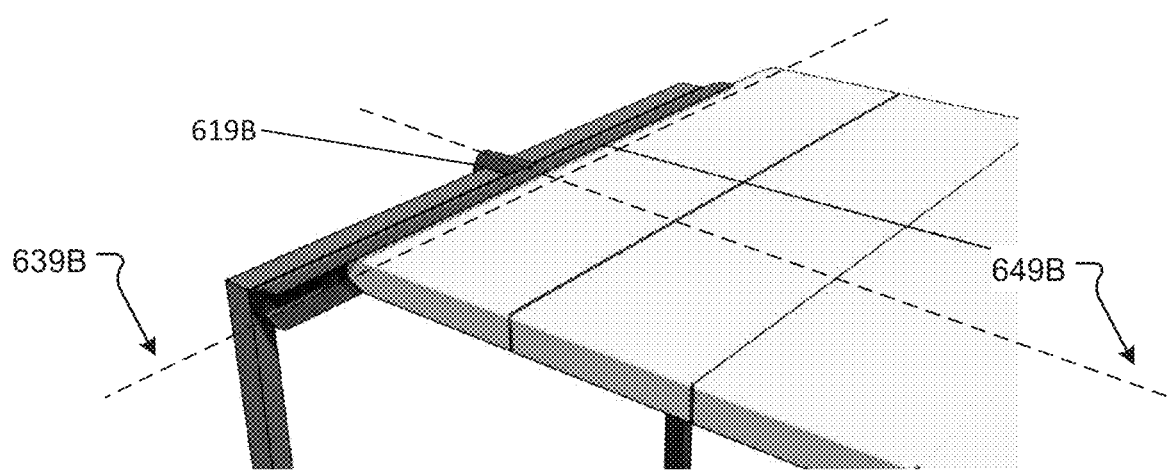
FIG. 6B is a perspective view of the structure of the embodiment of FIG. 6A.

FIG. 6A is a perspective view of a structure 600A according to an embodiment of the present disclosure. As shown, the structure 600A comprises a frame with a tiltable panel that is rotatable about at least a horizontal axis extending through a pivot point 619A. FIG. 6B depicts a further embodiment of the present disclosure wherein the panel is rotatable about a central axis 649B that extends through a pivot point 619B. The panel of FIG. 6B is also translatable along a track such that is operable to move along a plane 639B as shown.

Figure 7:
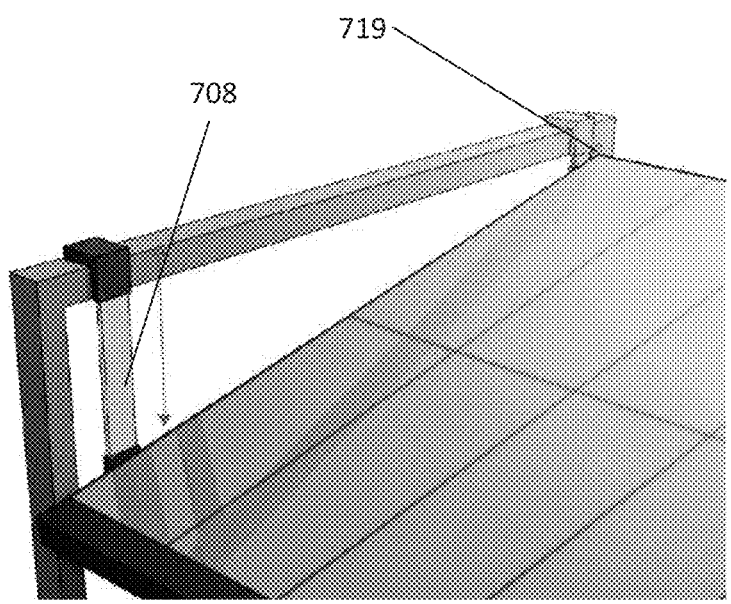
FIG. 7 is a perspective view of a protective shading structure according to one embodiment of the present disclosure.

FIG. 7 is a perspective view of another embodiment of the present disclosure and wherein a panel is provided and secured to a frame. Connecting components such as hangars or braces 708, 719 are provided. As shown, the connecting components 708, 719 are contemplated as being of different size or length to allow the panel to be positioned at an angle.

Figure 8:
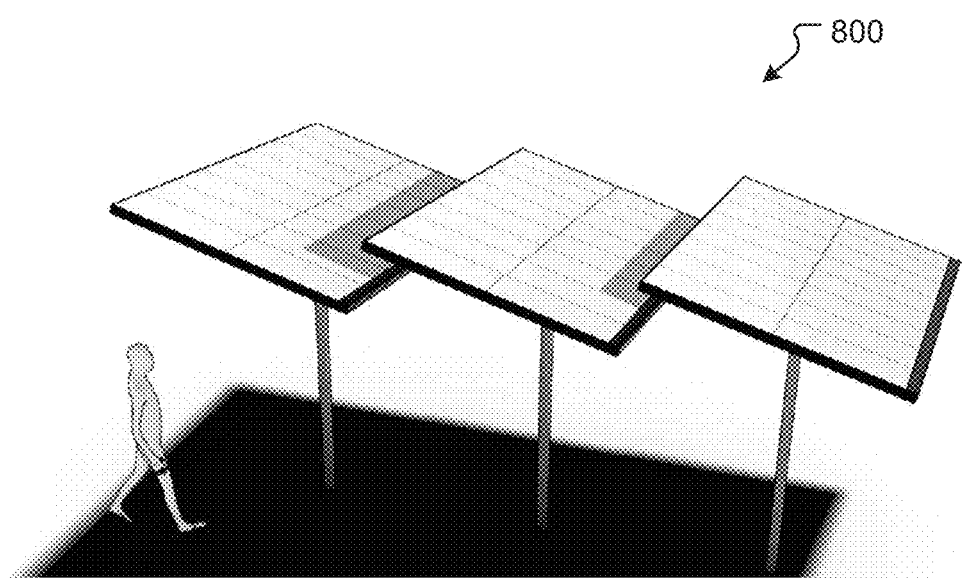
FIG. 8 is a perspective view of an arrangement of protective shading structures according to one embodiment of the present disclosure.

FIG. 8 is a perspective view of a system 800 of the present disclosure wherein a plurality of panels or coverings in accordance with the present disclosure are provided. As shown, a plurality of panel are provided to create a desired amount of surface area or volume beneath the system to be cooled. The panels are contemplated as comprising a PCM and may comprise any one or more of the embodiments of panels and coverings as shown and described herein. The panels may be adjustable and comprise features and structures as shown in FIG. 3, for example.

Figure 9A:
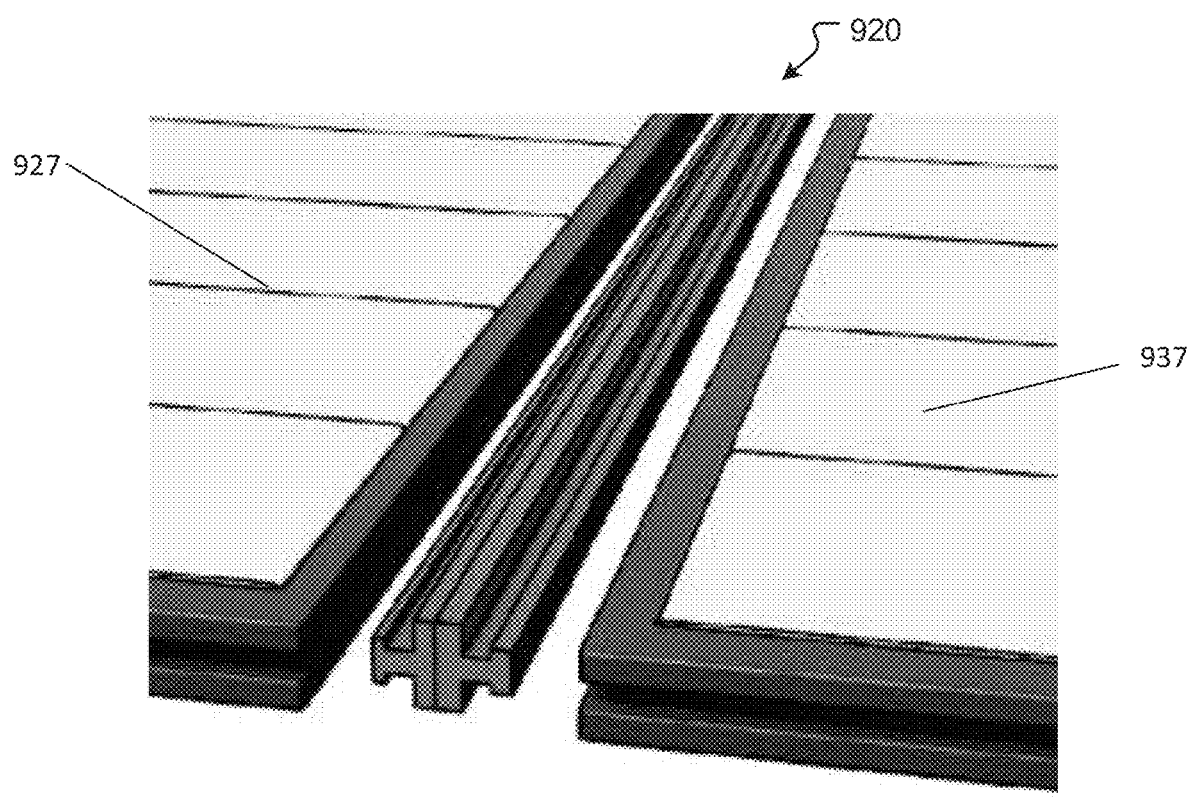
FIG. 9A is a perspective view of an interconnection system for a structure according to an embodiment of the present disclosure.
Figure 9B:
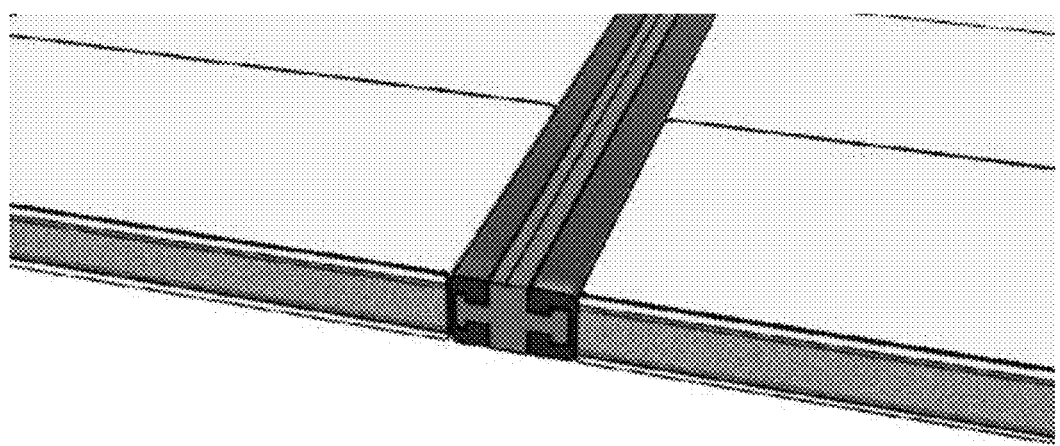
FIG. 9B is a perspective view of the embodiment of FIG. 9A.

FIGS. 9A-9B are perspective views of a connecting and interconnecting system for panels 927, 937. As shown, a connecting rod 920 of a particular cross-sectional shape is provided and is operable to slidingly mate with first 927 and second 937 panels that comprise a slot or recess. In such a manner, the panels 927, 937 may be connected in an end-to-end manner and the system may be quickly and affordably scaled to cover various areas and environments. FIG. 9B illustrates an assembled pair of panels.

Figure 10A:
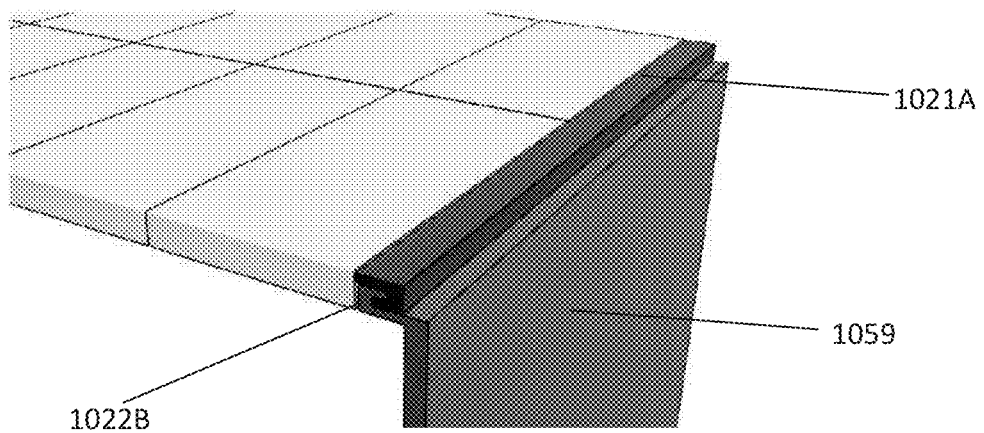
FIG. 10A is a perspective view of a protective shading structure according to an embodiment of the present disclosure.
Figure 10B:
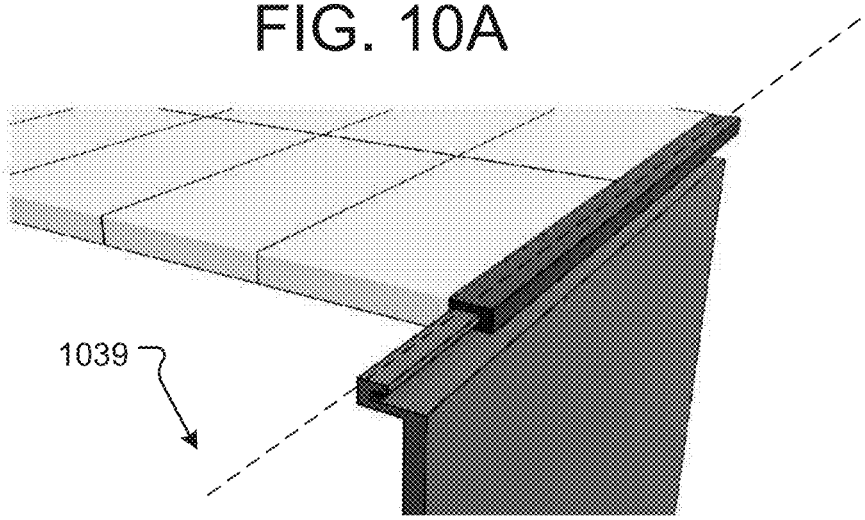
FIG. 10B is a perspective view of the embodiment of FIG. 10A.
Figure 10C:
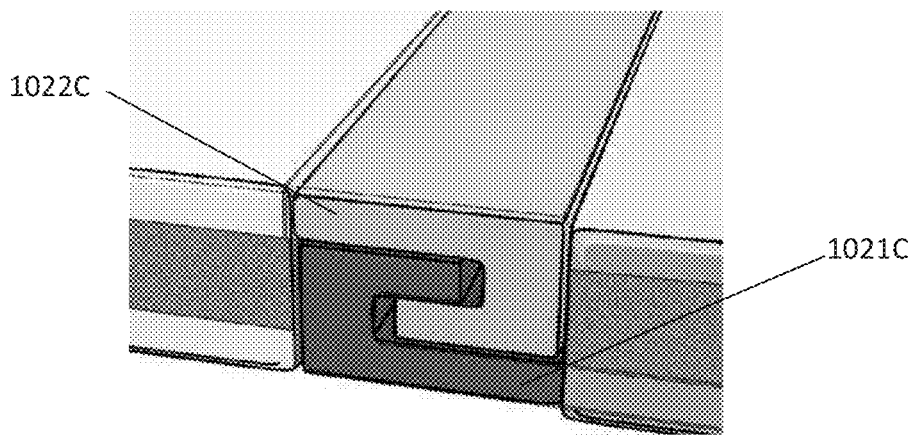
FIG. 10C is a perspective view of the embodiment of FIG. 10A.

FIGS. 10A-10C depict a panel connection system according to another embodiment of the present disclosure. As shown in FIG. 10A, a lateral end of a panel comprises or is connected to a track member 1021A. A support member 1059 for supporting the panel is provided and comprises a corresponding track member 1022B. The track members 1021A, 1022B generally comprises opposed J-shaped members that are slidingly engageable with one other to secure the panel to the support member 1059. As shown in FIG. 10B, panel installation is enabled by sliding the track member 1021A along a plane 1039 and wherein the first track member 1021A engages the second track member 1022B. FIG. 10C depicts an embodiment of the present disclosure that is similar to the embodiment of FIG. 10A and wherein two adjacent panels are slidingly engaged by the track members 1022C, 1021C.

Figure 11:
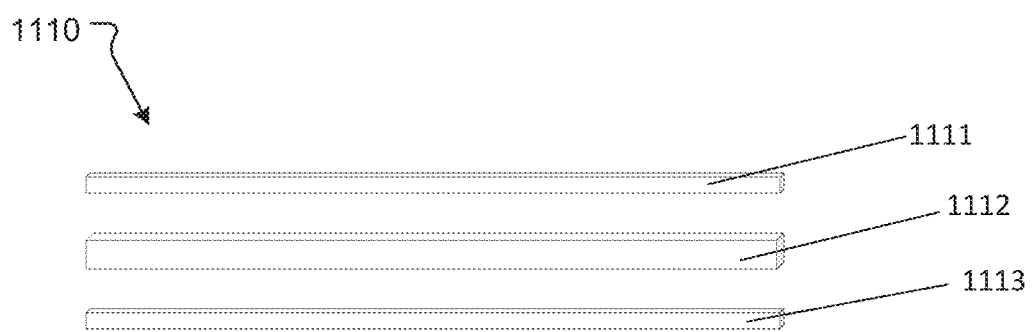
FIG. 11 is an exploded perspective view of components of a system according to embodiments of the present disclosure.

FIG. 11 is an exploded perspective view of a plurality of layers 1111, 1112, 1113 that are contemplated as forming a composite 1110 according to an embodiment of the present disclosure. As shown, the composite 1110 is contemplated for use with overhead shading, covering and cooling systems including those shown and described herein. The composite 1110 is contemplated as comprising a first upper layer 1111 which, in some embodiments, comprises a lid or cover member including solar reflective properties. A second, middle layer 1112 is provided which, in some embodiments, comprises one or more PCMs. A third, lower layer 1113 is provided that is contemplated as comprising a solid surface, mesh screen, or grate for supporting the PCM while allowing for heat transfer through the third layer 1113, for example. The layers are contemplated as being welded, adhered, fastened, or simply stacked together. The composite 1110 is contemplated as being provided with a track or frame member and may be provided in combination with the various structures and applications as shown and described herein. Various additional layers are contemplated including, for example, an insulating layer, a photovoltaic layer and other layers and features.

Figure 12:
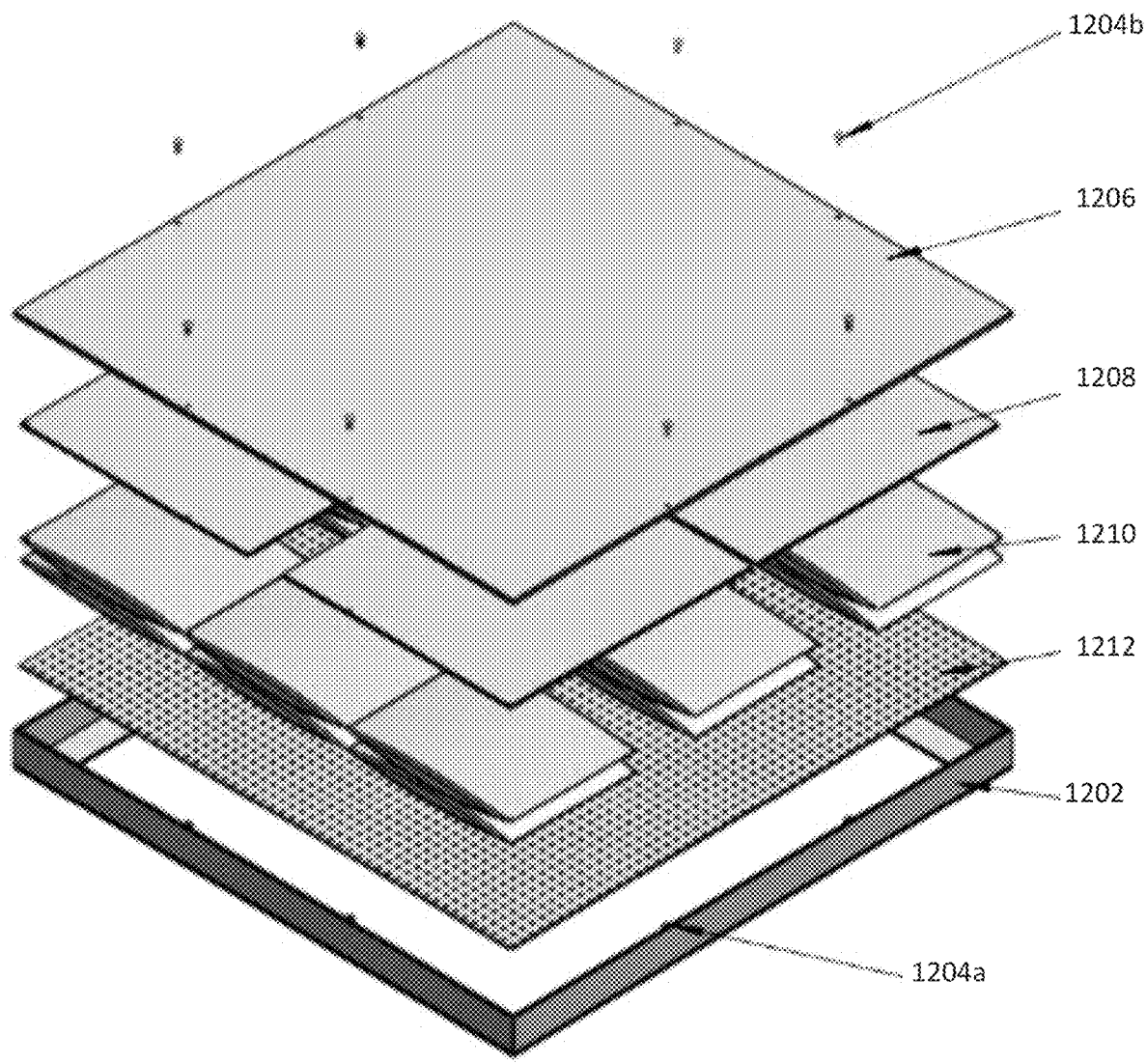
FIG. 12 is an exploded perspective view of components of a system according to embodiments of the present disclosure.

FIG. 12 is an exploded perspective view of a covering element 1200 according to an embodiment of the present disclosure. While the element 1200 of FIG. 12 is provided as a square shaded member of a certain size, no limitation with respect to dimensions, shape, or proportions are provided. As illustrated, the element 1200 comprises a bracket 1202 for receiving and supporting components. The components may be secured to or within the bracket 1202 by one or more fasteners 1204a, 1204b. More specifically, the element is contemplated as comprising a lid or covering 1206, an insulation layer 1208, one or more PCMs 1210, and a screen or perforated metal element 1212.

As shown, the lid 1206 preferably comprises a durable, lightweight outer housing with low thermal conductivity. In some embodiments, the lid 1206 comprises fiberglass to prevent or limit heat from transferring to the interior or underside of the panel. The lid 1206 is contemplated as comprising a reflective coating on the exterior of the lid. An insulation layer 1208 is provided that preferably comprises lightweight insulation with low thermal conductivity to prevent or limit solar energy from transferring through the panel and/or PCM. A PCM region or layer 1210 is provided. In some embodiments, the PCM region(s) or layer(s) provided within the structure comprises a salt-based PCM (e.g. hydrated inorganic salts, calcium chloride hexahydrate) and/or an oil-based PCM comprising emulsifiers, gelling agents, fatty acids, fatty alcohols, fatty esters, or their derivatives. By way of example and without limitation, one PCM that is contemplated as being provided in systems of the present disclosure is savENRG™ HS22 or HS24 that are commercially available from RGEES Ltd./PLUSS ADVANCED TECHNOLOGIES Pvt. Ltd. which are inorganic phase change materials. In other embodiments, it is contemplated that BioPCM™ 23Q M27 provided by Phase Change Solutions™ is provided in systems of the present disclosure. These specific PCMs are provided as examples only. Derivatives and alternatives to these materials are contemplated as being within the scope of the present disclosure and the PCM(s) provided may be varied and altered based on site-specific conditions, commercial availability, user requirements or desires, etc.

In various embodiments, systems of the present disclosure are optimized and designed for specific climate regions. For example, PCMs are contemplated as being selected based on average day and nighttime temperatures for a specific region. It is contemplated that for regions with average summer temperatures at 80° during the day and 60° at night, a PCM comprising a melting point of 22° C. is provided. As a non-limiting examples, for regions with hotter climates (e.g. 100° F. during the day and 80° F. at night), a PCM comprising a melting point of approximately 30° C., which may be higher or lower, is provided. In some embodiments, an oil-based PCM is provided that can be injected into a flexible canopy material. In other embodiments, sodium chloride-based PCMs are provided in rigid or semi-rigid structures.

A screen or mesh layer 1212 is provided in some embodiments to allow for heat transfer between the PCM and the environment beneath, below or proximal to the system. In some embodiments, the screen layer comprises perforated metal. It is further contemplated, however, that the screen or mesh layer comprises one or more of solid metal, wood, fiberglass, and/or other suitable materials. It is also contemplated that systems are provided that are devoid of a mesh layer 1212.

The covering element 1200 of FIG. 12 is contemplated as comprising a single unit and wherein a plurality of units may be assembled or provided to achieve the desired amount of surface area and coverage in various applications. Connection elements and structures as shown and described herein, for example, are contemplated as comprising any number of elements 1200 as shown in FIG. 12.

Figure 13:
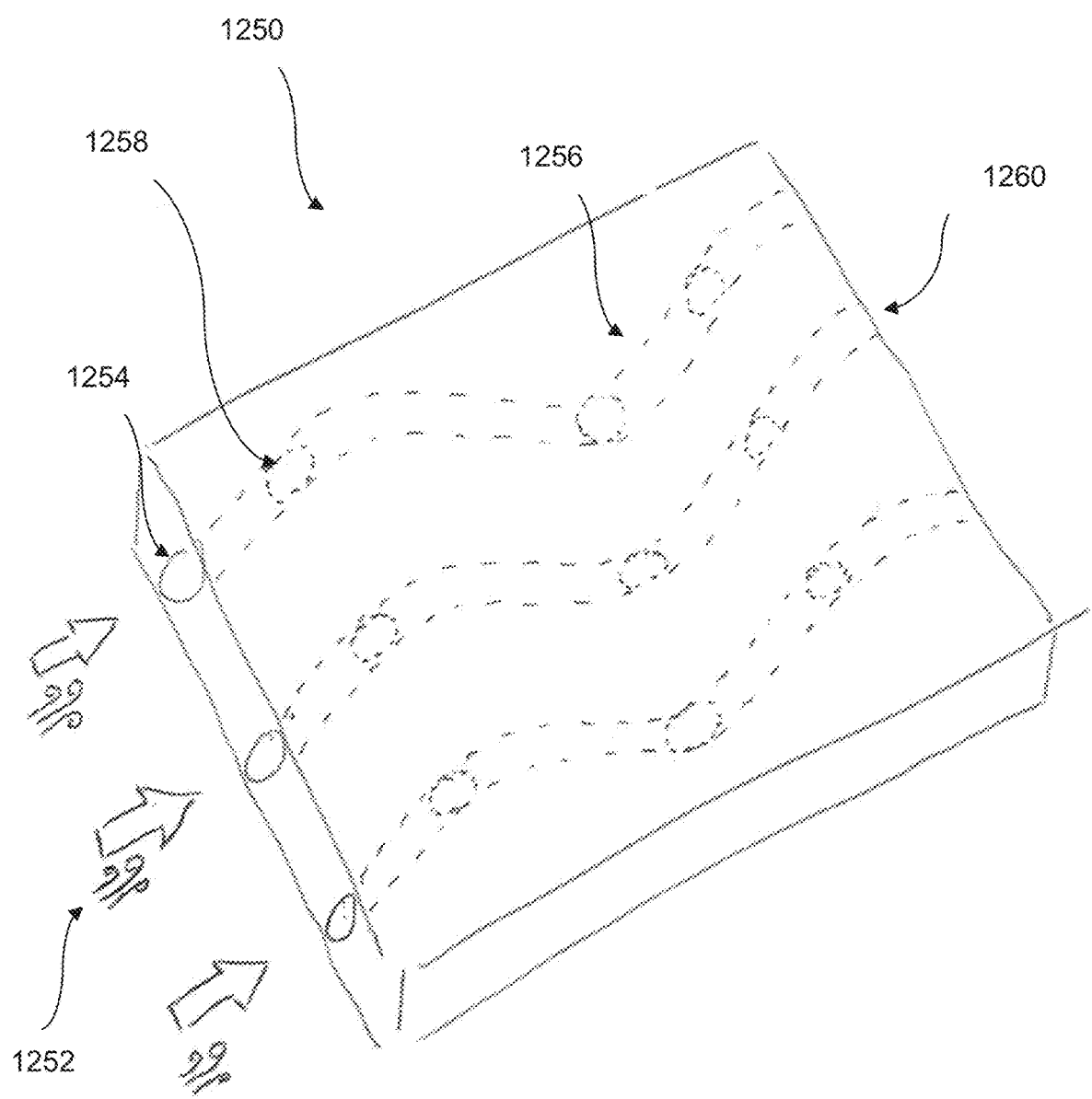
FIG. 13 is a perspective view a component of a system according to an embodiment of the present disclosure.

FIG. 13 is a perspective view of an element 1250 according to one embodiment of the present disclosure. The element 1250 of FIG. 13 comprises a flow element that is operable to direct, focus, or channel a working fluid or gas, including air, within the system. As shown, the element 1250 comprises ports 1254 along at least one lateral end of the element to direct flow 1252. Channels 1256 are provided within or through the element. The channels 1256 are contemplated as comprising serpentine or circuitous panels to increase surface area direct flow along a desired path. Egress ports 1258 are contemplated as being provided along the length of the channels to direct flow to areas beneath the panel(s). Second egress ports 1260 are contemplated as being provided at an opposing lateral end of the panel from the inlet ports 1254. The second egress ports are contemplated as being passive vents to allow flow to the outside environment. Alternatively, the second egress ports 1260 are contemplated as directing flow to inlet ports of a second, adjacent panel (not shown in FIG. 13). It is further contemplated that second egress ports 1260 are provided with seals or caps such as when the panel 1250 comprises the last panel in a series and/or when it is desirable to direct flow through the first egress ports 1258. It will be recognized that flow ingress and egress ports 1254, 1258 are contemplated as comprising substantially the same structure and may be referred to in the alternative.

The element 1250 of FIG. 13 is contemplated as being provided with various embodiments of the present disclosure and may be applied in various relative positions with respect to additional elements. For example, the element 1250 is contemplated as being provided directly above the PCM layer (in FIG. 12, for example) to direct flow across and/or onto the PCM. The element 1250 may be provided in various other locations, and more than one flow element 1250 is contemplated as being provided.

Figure 14:
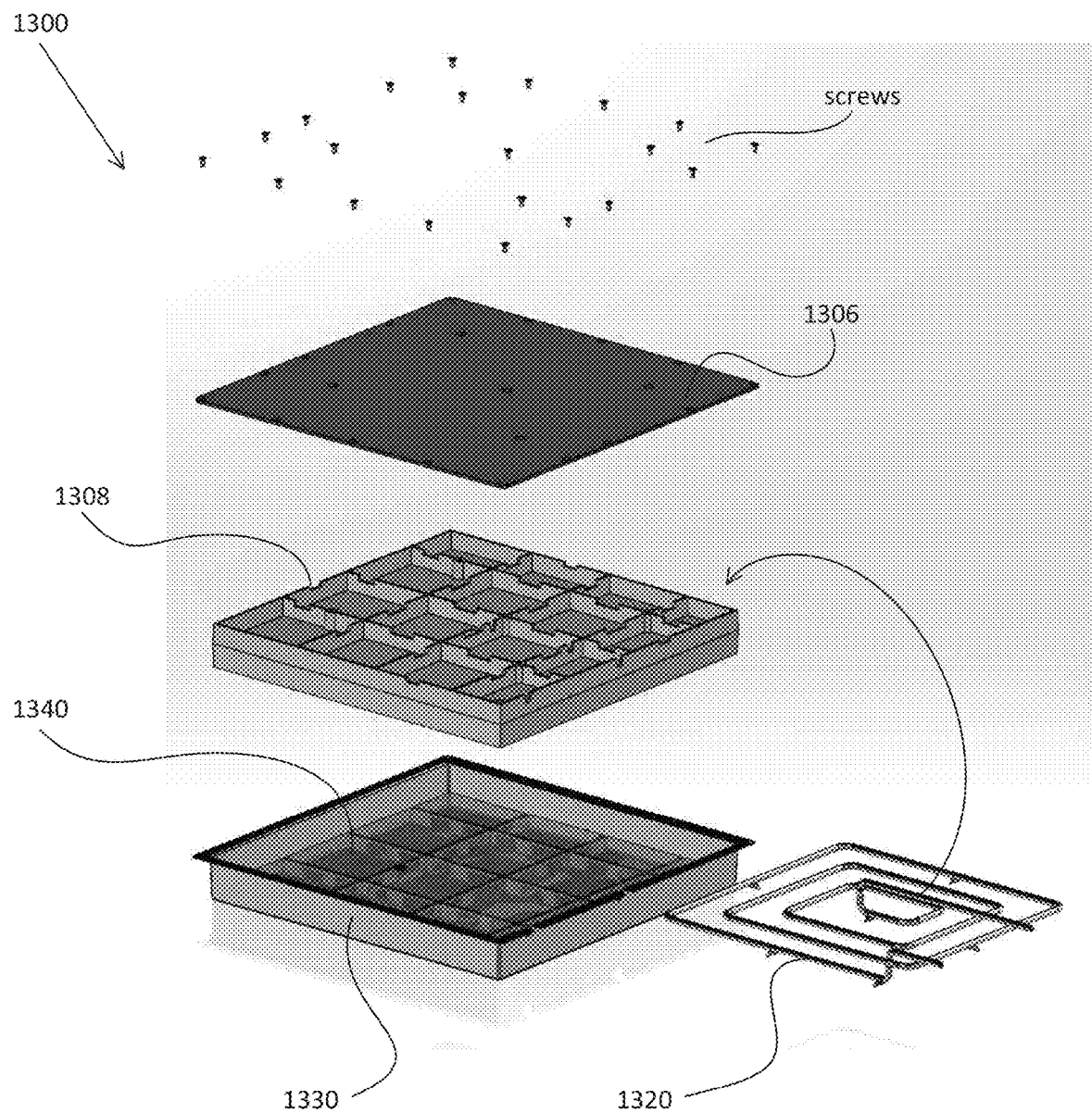
FIG. 14 is an exploded perspective view of a passive cooling panel assembly according to another embodiment of the present disclosure.

FIG. 14 is an exploded perspective view of a passive cooling panel assembly 1300 according to another embodiment of the present disclosure. The passive cooling panel assembly 1300 is generally intended for spaces where installation and user access is only feasible from a ceiling or interior side. Such an intended site may include without limitation, enclosed, partially enclosed, or open spaces in residential or commercial buildings. The passive cooling panel assembly 1300 incorporates an internal heat exchanger that can act a temperature management system to the space below. The passive cooling panel assembly 1300 may also comprise radiators configured to release latent heat. The internal heat exchanger 1320 is generally configured to remove latent heat by circulating a fluid at an intended temperature through a conduit system to induce a temperature exchange. As a non-limiting example, the thermal heat exchanger 1320 may comprise a piping system operatively configured with a pump to circulate water at an intended temperature. Ideally, this would be conducted during the evening to minimize disruption to occupied spaces.

Accordingly, and as shown in FIG. 14, the passive cooling panel assembly 1300 may comprise a support bracket 1330 configured and dimensioned to enclose a PCM layer 1340 and/or am insulating center layer 1308. The PCM layer 1340 is contemplated as comprising one or more PCM elements and, for example, may be substantially defined by an array of PCM panels or subsections operatively disposed within the support bracket 1330. A lid 1306 may be disposed above the support bracket 1330 and/or insulating center layer. The assembly 1300 may be secured in place by any one of a plurality of fasteners, i.e., screws, connectors, bolts, fastening mechanisms, etc. As such, the passive cooling panel assembly 1300 is generally an at least partially insulated and/or a fully insulated assembly around its perimeter. Such an arrangement as shown in FIG. 14 is advantageous as it can at least partially reduce parasitic heat absorption.

In various embodiments, cooling assemblies and systems are contemplated as comprising or permitting a flow of fluid. Heating and cooling efficiencies within a system or environment are contemplated as being improved in some embodiments by connecting fluid conduits (e.g. a heat exchanger 1320) to additional components. For example, a fluid (e.g.) water that has been heated by latent heat from a room and/or PCM may be connected to additional systems to provide heated water to a home plumbing system. The fluid and related conduit is also contemplated as being connected to a geothermal system (small or large scale) to convey thermal energy to a large heat sink, for example.

Figure 15:
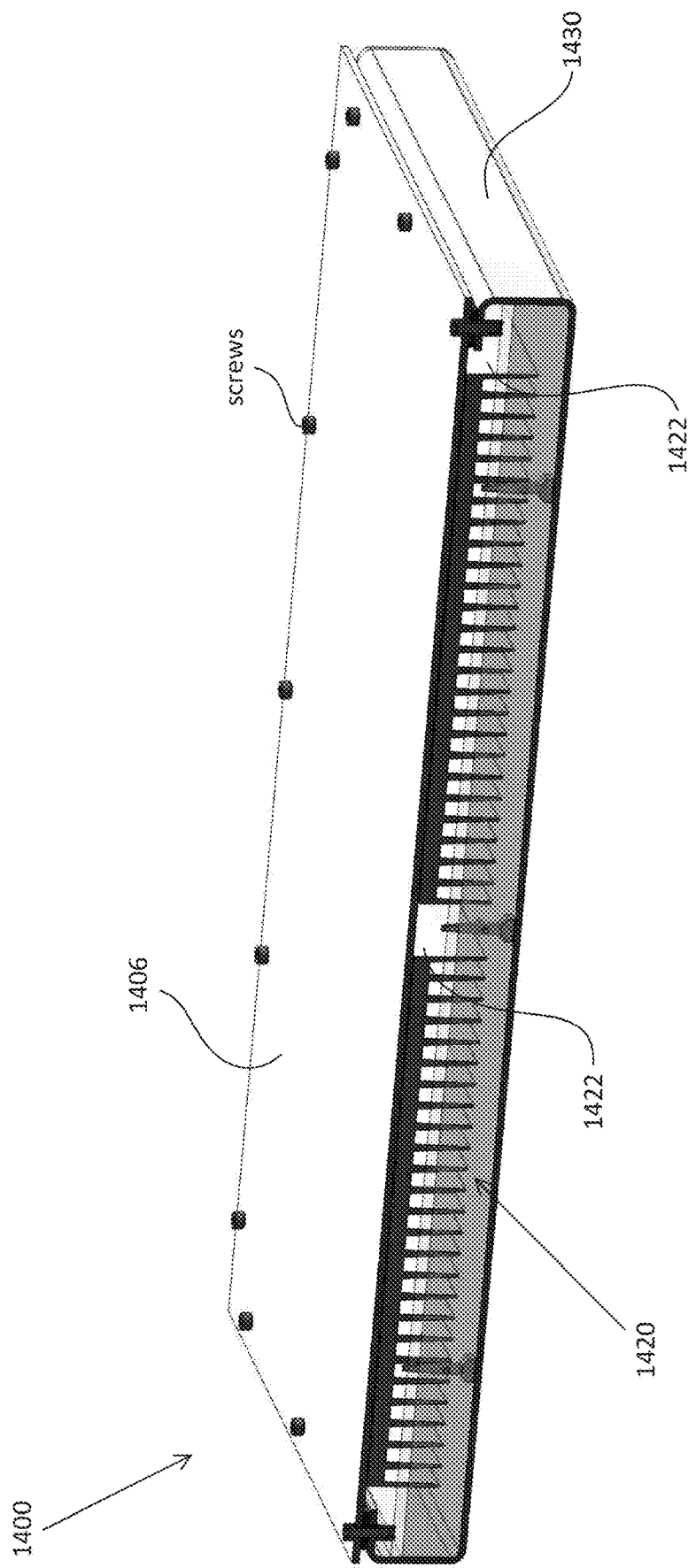
FIG. 15 is a perspective view of a passive cooling panel assembly according to another embodiment of the present disclosure.

FIG. 15 is a perspective view of a passive cooling panel assembly 1400 according to another embodiment of the present disclosure. The passive cooling panel assembly 1400 is generally intended for spaces where both the ceiling and the roof are accessible for its installation, service, etc. The passive cooling panel assembly 1400 is generally configured to not only act as a passive temperature management assembly to the area below it, but also as an assembly that is capable of dissipating stored heat to the exterior, for example, at nighttime. Said differently, the passive cooling panel assembly 1400 should generate a cooling effect below it, i.e., on the ceiling, for example due to the cooling effect of PCM surfaces. However, the passing cooling panel assembly 144 should also act as a thermally conductive panel to the roof and/or to the exterior. As such, the present invention contemplates that the passive cooling panel assembly 1400 be used in combination with a specialized cool roof surface, e.g., a high-performance roof, that can radiate heat to the exterior.

As shown in FIG. 15, the passive cooling panel assembly 1400 generally comprises a bracket assembly 1430 that is operatively connected to a lid or roof panel 1406. By way of example, the assembly 1400, including the connection between the bracket 1430 and the lid 1406 may be secured in place by any one of a plurality of fasteners, i.e., screws, connectors, bolts, fastening mechanisms, etc. As is further shown in FIG. 15, a heat sink assembly 1420 comprising one or more individual heat sinks 1422 may be operatively disposed within the bracket assembly 1430. The heat sinks 1422 are generally bonded to the lid or roof panel 1406. As used herein, the term "heat sink" generally refers to temperature management element, i.e., a passive heat exchanger, that is capable of transferring or otherwise dissipating heat from another element or component. Thus, as herein contemplated, the heat sink assembly 1420 is generally configured to dissipate heat in an upward direction so that the roof may radiate the heat to the exterior. In addition to the heat sink assembly 1420, individual PCM structures, panels and/or layers may be disposed within the bracket assembly 1430, for example, below the heat sinks 1422. In an alternative embodiment, the heat sinks 1422 themselves may comprise a PCM material.

Figure 16A:
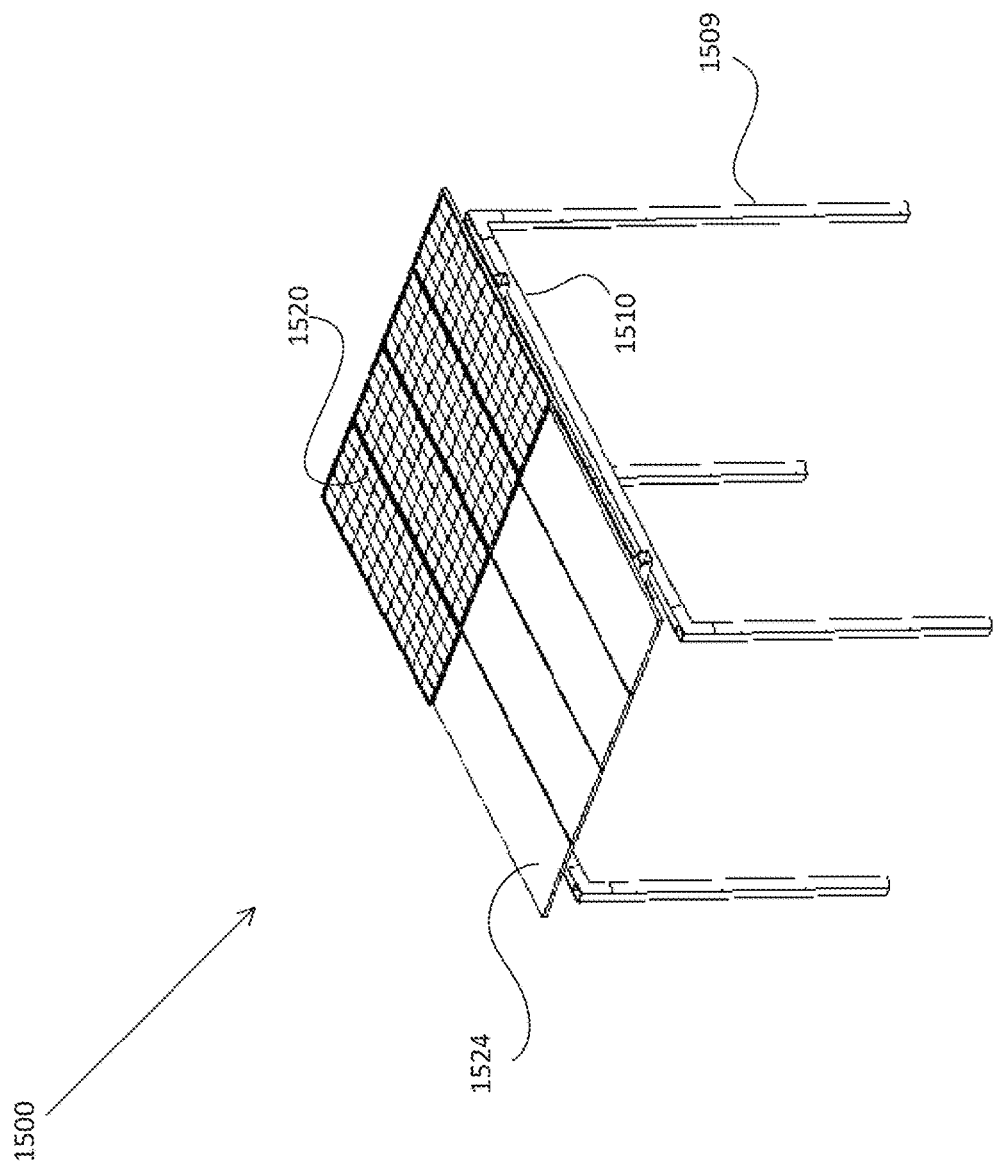
FIG. 16A is a perspective view of one embodiment of a shade structure according to the present invention.
Figure 16B:
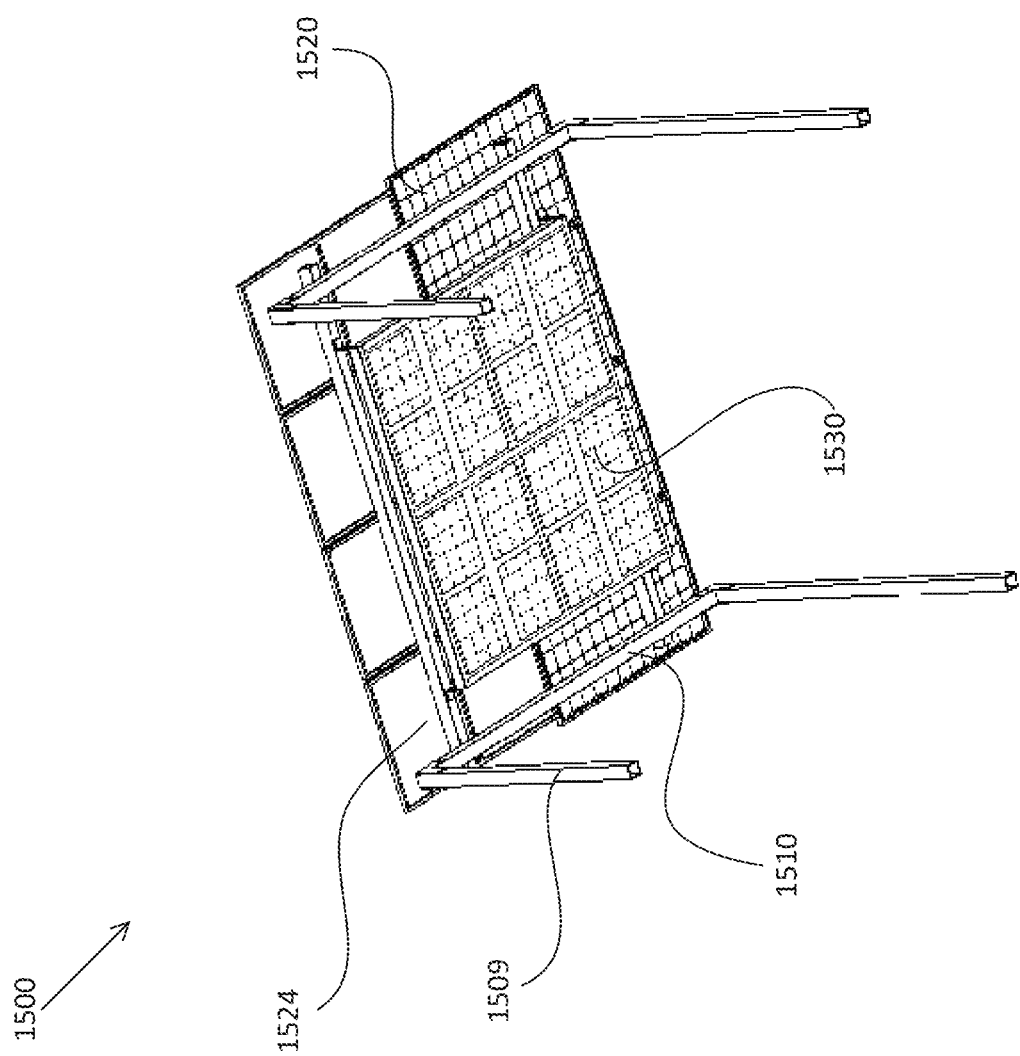
FIG. 16B is a bottom perspective view of the embodiment depicted in FIG. 16A.

FIG. 16A is a perspective view of one embodiment of a shade structure 1500 according to the present invention. FIG. 16B is a bottom perspective view of the embodiment depicted in FIG. 16A. The shade structure 1500 can serve as a canopy or shade structure, which incorporates one or more of cooling panels 1530, including PCM panels, solar panels 1520 and/or radiative cooling panels 1524. As such, the shade structure can incorporate distinct elements, which may synergistically act to provide temperature-managed shaded area while also reducing its associated carbon footprint. For example, as shown in FIG. 16A vertical support elements 1509 may collectively support horizontal support elements 1510, which may be configured to support other support members and/or arrays of radiative cooling panels 1524 and solar panels 1520. As a further example, as shown in FIG. 16B, an array of PCM panels 1530 may be secured to support elements of the ceiling, i.e., below the roof and viewable when standing below the canopy. Such arrays of PCM panels 1530 may be lifted and secured to the ceiling by using corner brackets and/or structural bolts. Additionally, a decorative trim may be added to cover the PCM array and/or the perimeter of the shade structure 1500.

Various embodiments of the present disclosure that comprise free-standing structures (e.g. the embodiment of FIGS. 16A-16B) are contemplated as being installed or deployed in various locations. In some embodiments, such free-standing structures are contemplated as comprising fluid flow channels for increasing efficiencies. In some embodiments, such fluid flow channels comprise air flow channels for allowing ambient air to flow through portions of the structure. It is also contemplated that free-standing structures comprise forced fluid flow features including pumped water heat exchangers and the like. The structures are contemplated as being connected to municipal water supplies, rain water supplies, and/or may be provided with a dedicated water (or other) source. Accordingly, it should be recognized that system comprising a liquid cooling element and related system are not limited to indoor systems or systems that are installed in a pre-existing building structure.

While various embodiments of the present disclosure are contemplated as providing shading and cooling features to mitigate the impacts of excessive heat, it should be recognized that the present disclosure comprises inventive aspects that are not limited to cooling or reducing temperature for comfort. Modifications to the panels and system disclosed herein are contemplated that allow a panel and PCM to emit thermal energy to warm a space.

The examples set forth above are provided to give those of ordinary skill in the art a complete disclosure and description of how to make and use the embodiments of the disclosure and are not intended to limit the scope of what the inventors regard as the scope of the disclosure. Modifications of the above-described modes for carrying out the disclosure can be used by persons of skill in the art, and are intended to be within the scope of the following claims.

It is to be understood that the disclosure is not limited to particular methods or systems, which can, of course, vary. It is also to be understood that the terminology used herein is for the purpose of describing particular embodiments only, and is not intended to be limiting.

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A thermal management device comprising:
a panel member comprising a plurality of components, at least one of the plurality of components comprising a phase change material,
the panel member configured to at least partially extend over an area to be thermally managed, and
the phase change material being operable to at least partially lower the temperature of the area by the absorption of heat energy.

2. The thermal management device of claim 1, wherein the phase change material is operable to recharge and release latent heat at least via one of the following methods:
a heat exchanger where a separate working fluid flows through the panel member to absorb and remove heat energy, and
radiation exchange to the exterior during nighttime.

3. The thermal management device of claim 1, wherein the plurality of components of the panel member further comprises a bracket configured to enclose at least the phase change material.

4. The thermal management device of claim 3, wherein the plurality of components of the panel member further comprises:
a first layer comprising a perforated layer, a solid metal layer or a plastic layer disposed below the phase change material,
a second layer disposed above the first layer and configured to contain the phase change material, and
a lid disposed above the bracket.

5. The thermal management device of claim 3, wherein the phase change material comprises a folded and stacked arrangement of sheets disposed in individual rows within the bracket.

6. The thermal management device of claim 3, wherein the plurality of components of the panel member further comprises a heatsink assembly connected to a lid of the bracket; the heatsink assembly comprising at least one heat sink structure configured to dissipate heat above the panel member and to the exterior during nighttime.

7. The thermal management device of claim 1, wherein the plurality of components of the panel member further comprise a heat exchanger configured such that a separate working fluid may flow through it and absorb and remove heat energy from the area to be thermally managed.

8. The thermal management device of claim 7, wherein the heat exchanger comprises a metal piping system disposed within an insulation layer; the insulation layer disposed above the phase change material; the metal piping system configured to accommodate a flow of the separate working fluid.

9. The thermal management device of claim 7, wherein the heat exchanger comprises:
a plurality of channels collectively disposed in a serpentine or circuitous path and collectively configured to increase a surface area of direct airflow within a desired path, and
egress ports disposed in fluid communication with the channels, the egress ports disposed on lateral edges of the panel member and around a bottom face of the panel member, and the egress ports configured to direct the airflow to an area beneath the panel member.

10. A thermal management device comprising:
a panel member being part of a self-standing structure comprising a support assembly, the panel member comprising a plurality of components, at least one of the plurality of components comprises a phase change material,
the panel member configured to at least partially extend over an area to be thermally managed, and
the phase change material being operable at least partially lower the temperature of the area by the absorption of heat energy.

11. The thermal management device of claim 10, wherein the self-standing structure comprises a tilting mechanism cooperatively configured with a controller to automatically adjust an orientation of the panel member based on a relative position of the sun; the tilting mechanism configured to increase coverage of the area to be thermally managed.

12. The thermal management device of claim 11, wherein the tilting mechanism is configured to tilt the panel member around an axis defined along its own length around a pivot of the panel member.

13. The thermal management device of claim 12, wherein the support assembly comprises an axle configured to rotate around the axis defined along the length of the panel member; the panel member operatively connected to the axle and configured to reciprocate a rotation thereof.

14. The thermal management device of claim 12, wherein the support assembly comprises at least one track configured to retain the panel member around an outer edge thereof; the panel member configured to reciprocally move along a plane substantially defined along a length of the at least one track.

15. The thermal management device of claim 11, wherein the tilting mechanism comprises a plurality of wires operatively connected to the support assembly and the panel member; the plurality of wires and the support assembly collectively configured to lower the position of a first outside edge of the panel member according to the relative position of the sun.

16. The thermal management device of claim 11, wherein the tilting mechanism comprises a hangar assembly or an adjustable brace; the tilting mechanism configured to lower the position of a first outside edge of the panel member according to the relative position of the sun.

17. The thermal management device of claim 10, wherein the panel member comprises an interconnecting mechanism at least partially disposed around at least one outer edge thereof and configured to enable an attachment of a second panel member comprising a substantially equivalent structure; the interconnecting mechanism comprising a first recess disposed substantially along the outer edge of the panel member, a second recess disposed substantially along an outer edge of the second panel member and a connecting rod comprising protrusions disposed on opposite sides thereof; the protrusions configured and dimensioned respectively with the first recess and second recess to collectively define a mating, sliding engagement between the connecting rod and the panel member and between the connecting rod and the second panel member.

18. The thermal management device of claim 10, wherein the panel member comprises an interconnecting mechanism at least partially disposed around at least one outer edge thereof; the interconnecting mechanism being configured to permit an attachment of a support member of the support assembly; the interconnecting mechanism comprising a first J-shaped member disposed substantially along the outer edge of the panel member and a second J-shaped member disposed substantially along an outer edge of the support member; the first J-shaped member and the second J-shaped member slidingly engageable to one another to secure the panel member to the support assembly in a substantially perpendicular alignment thereto.

19. The thermal management device of claim 10, further comprising one or both of an array of solar panels at least partially disposed above the panel member or an array of radiative cooling panels at least partially disposed above the panel member; the panel member further comprising an array of phase change material boards disposed within a structural frame; the structural frame disposed on the support assembly.

20. A thermal management device comprising:
a panel member configured to at least partially extend over an area to be thermally managed, the panel member comprising:
a phase change material being operable to at least partially lower the temperature of the area below it by the absorption of heat energy,
a metal layer disposed below the phase change material,
an insulation layer disposed above the phase change material,
a heat exchanger comprising a metal piping system operatively disposed within the insulation layer; the heat exchanger configured such that a separate working fluid comprising a gaseous or liquid substance may flow through it and absorb and remove heat energy from the area to be thermally managed,
a bracket being configured to enclose the phase change material, the metal layer and the insulation layer, and
a lid disposed above the bracket and configured to attach the panel member to a ceiling, and
the phase change material being operable to recharge and release latent heat at least via one of the following methods:
a heat exchanger where a separate working fluid flows through the panel member to absorb and remove heat energy, and
radiation exchange to the exterior during nighttime.

* * * * *